(12) United States Patent
Kloppenberg et al.

(10) Patent No.: US 6,192,693 B1
(45) Date of Patent: Feb. 27, 2001

(54) ICE SYSTEM HAVING SENSOR POCKET

(75) Inventors: Joseph R. Kloppenberg, Englewood, CO (US); John Kevin McCool, Winnetka, IL (US)

(73) Assignee: Howe Corporation, Chicago, IL (US)

( * ) Notice: Subject to any disclaimer, the term of this patent is extended or adjusted under 35 U.S.C. 154(b) by 0 days.

(21) Appl. No.: 09/289,298

(22) Filed: Apr. 9, 1999

Related U.S. Application Data (60) Provisional application No. 60/081,316, filed on Apr. 10, 1998.

(51) Int. Cl.[7] .................................................... F25C 5/18
(52) U.S. Cl. ......................... 62/137; 250/222.1; 340/617
(58) Field of Search ..................... 62/137, 344; 340/583, 340/617; 250/221, 222.1, 239

(56) References Cited

U.S. PATENT DOCUMENTS

| | | | |
|---|---|---|---|
| 3,322,959 | * | 5/1967 | Lorenz ................................. 340/617 |
| 3,731,496 | * | 5/1973 | Frazier ................................. 62/137 |
| 4,822,996 | * | 4/1989 | Lind ................................. 250/222.1 |
| 5,211,030 | * | 5/1993 | Jameson ................................. 62/344 |
| 5,560,211 | * | 10/1996 | Parker ................................. 62/137 |
| 5,671,606 | * | 9/1997 | Schroeder et al. ................... 62/137 |
| 5,744,793 | * | 4/1998 | Skell et al. ......................... 250/222.1 |

\* cited by examiner

*Primary Examiner*—William E. Tapolcai
(74) *Attorney, Agent, or Firm*—Mayer, Brown & Platt

(57) ABSTRACT

An ice collection bin includes an exterior surface and an interior surface defining an interior chamber used to collect ice or other frozen particles. The level of frozen particles in the interior chamber is controlled by a level sensor assembly. Sensor pockets disposed in the bin protect the components of the level sensor assembly from damage that can occur in connection with the use of the ice collection bin to store frozen particles. An ice collection system is also provided, and includes the ice collection bin, a frozen particle making machine, an elevated frame that elevates the ice collection bin, and a cart for storing or transporting frozen particles.

6 Claims, 4 Drawing Sheets

ICE SYSTEM HAVING SENSOR POCKET

This application claims the benefit of U.S. Provisional Application No. 60/081,316 filed on Apr. 10, 1998 for ICE COLLECTION BIN AND ICE SYSTEMS USING THE SAME.

BACKGROUND OF THE INVENTION

1. Field of the Invention

The present invention relates to a system for producing and storing ice particles or a similar freezable liquid in the form of flakes, cubes, chunks or other forms. Particularly, the present invention is directed to an ice system, wherein ice particles are collected in an ice collection bin that has a level sensor assembly configured such that the level sensor assembly is easily accessible, is not misaligned or damaged during operation of the ice system, and such that the ice system is constructed of components that are lightweight, durable, easy to maneuver, and inexpensive to manufacture.

2. Description of the Related Art

Ice systems capable of freezing water or other freezable liquid in the form of ice particles, such as flakes, cubes, chunks or other forms, are well-known and have been available for a number of years. These ice systems are widely used in various industries related to the production, storage, preservation, and presentation of food products, including meat, produce, poultry, fish, sausage, catering and bakery industries. For example, ice systems may be used to produce the equivalent of food concentrates, such as for juices, beverages or other liquid food products. The bakery industry uses ice particles produced from ice systems for the preparation of dough to keep the dough cool, and to thereby prevent unintentional cooking. Other industries, including the chemical and concrete industries use ice systems in process cooling. Additionally, the medical field uses ice particles for treatment and patient care, as well as for freezing selected liquids, such as certain medications, blood, and glucose in ice particles for storage.

Generally, a conventional ice system includes an ice making machine to freeze and form the ice particles, a controller to control the production of ice particles by the ice making machine and a bin to collect and store the ice particles. Additionally, a cart may be used to distribute the ice particles if desired. Associated components of a refrigeration cycle, including an accumulator, compressor, condenser, receiver, and heat exchanger also are generally required. Such ice systems are well known.

Conventional ice systems incorporate an ice making machine with an evaporator, such as a flake freezing machine that produces ice in the form of flakes. Typically, in a flake freezing machine, the evaporator has a cylindrical configuration with an inner cylindrical side wall and an outer cylindrical side wall which together define an annular chamber. Refrigerant flows into the annular chamber and, before flowing out, vaporizes the annular chamber so as to cool the inner cylindrical side wall. Water or some other freezable liquid is distributed and frozen onto the inner cylindrical side wall, and then removed in the form of ice particles. Vertical partitions are radially spaced along the annular chamber to create more uniform distribution of the refrigerant.

A known alternative to a flake freezing machine also includes a cylindrical evaporator configuration. Rather than a partitioned evaporator structure, this alternative embodiment is constructed of a series of steel hoop members. Each hoop member includes a ring-shaped horizontal leg and a downwardly-extending peripheral vertical leg. The hoop members are configured in the form of a spiral ring-type labyrinth, which directs the refrigerant in a circular pattern around the central cylinder. The circular flow of refrigerant uniformly cools the central cylinder sufficiently to freeze water or similar freezable liquid thereon to produce ice particles.

The operation of the ice maker is controlled by a control panel in electrical communication with the ice making machine drive mechanism. The ice system also incorporates a basic refrigeration cycle, including an accumulator, compressor, condenser, receiver and heat exchanger. A variety of such ice flaking machines and associated system components are available from Howe Corporation of Chicago, Ill.

Once produced by the ice making machine, ice particles are collected and stored in a bin. The bin may have any of a variety of shapes and sizes, but generally is rectangular in shape. As such, a conventional bin has six walls, defined by six interior surfaces (four sides, a top and a bottom interior surface), and six corresponding exterior surfaces so as to define a gap or space therebetween. This gap or space between the interior and exterior surfaces is often filled with an insulating material such as polyurethane. Furthermore, the interior surfaces define an interior chamber used to collect and store ice particles. Typically, the ice making machine is mounted on top of the bin. The bin has a top access opening through which ice particles enter the bin after exiting the ice making machine. After settling in the bin, the ice particles may often bridge or otherwise freeze together within the bin. Therefore, it is common that the bin has a side access through which any bridged ice particles may be broken apart using an ice paddle or other appropriate instrument. It is also common for the bin to have one or more discharge chutes through which ice particles are removed from the bin.

It also is well-known to include in the ice making system a level control system to prevent ice particle overflow in the bin and ice making machine. Failure to use proper ice particle level control may cause ice to build up within the ice making machine after the bin is full. Operating the ice making machine with a full bin will prevent ice particles from properly discharging from the ice making machine resulting in damage to the internal components of the ice making machine. As part of the level control system, it is well-known to use two photo electric or photo eye sensors in electrical communication with the control panel. Typically, these photo eye sensors are mounted on separate brackets at opposite sides of the bin at a desired height. Electrical wire is run to the control panel from the photo eye sensors along the interior surfaces and out through the top access of the bin. When the level of ice in the interior chamber reaches a predetermined level, the level sensors electrically signal the controller to discontinue the production of ice particles in the ice making machine. It has been found, however, that the collection, discharge, stirring, and breaking apart of the ice particles in the bin often will result in undesirable damage, misalignment or wear to the level sensors and associated electrical wiring.

Conventional ice systems also may include an elevated base to support the bin. If one or more discharge chutes are provided in the bottom of the bin, it is well known to construct the elevated base of square steel tube or the like and to configure the elevated base so that one or more carts can easily be either positioned or removed from underneath the bin discharge chute. Typically, the cart is mobile, supported by two or more wheels, and is used to collect and transport ice particles. It is well known to use carts of dual wall construction, typically including at least an exterior wall constructed of stainless steel or other suitable materials. The interior wall may be stainless steel or a similar durable material and the space between the exterior and interior being filled with insulation such as polyurethane. Such carts are heavily constructed, and may be difficult to maneuver in tight spaces. It is also well-known to use carts that have stainless steel tops that either are constructed separately so as to be completely removed during operation or are attached by hinges such that the top extends laterally outwardly from the cart. Where the cart is constructed with a separate top that must be completely removed for unloading, the likelihood of both cross-contamination and loss of the top increases. Where the top opens out laterally on hinges, the top may interfere with loading or unloading of the ice particles, such as when there is limited space, or when unloading must be performed quickly. Additionally, such hinged tops may be difficult to remove for cleaning and sanitizing.

As an alternative to mobile carts, it is also well-known to use an upright bin where the discharge chute is provided as a secondary access opening in the side or front of the bin. In the case of an upright bin, a bin of increased capacity typically is mounted on four relatively short legs rather than the aforementioned elevated base. Ice particles therefore are removed with an ice scoop or other appropriate instrument.

Although the conventional systems described above provide satisfactory results, there remains a need for an ice system that includes an ice collection bin and level control system where electrical connections from the level sensors have limited exposure to the interior chamber of the ice collection bin, where the electrical connections and level sensors are easily accessible for maintenance, repair or removal, and where the level sensors are mounted in the bin such that the level sensors are capable of remaining in proper alignment, and of avoiding damage from ice particles, ice paddles, ice removal tools and other instruments used in the operation of the ice system. Furthermore, there likewise remains a need for an improved ice system as a whole that includes components that are relatively lightweight, maneuverable, and less expensive to manufacture.

SUMMARY OF THE INVENTION

The purpose and advantages of the invention will be set forth in and apparent from the description and drawings that follow below, as well as will be learned by practice of the invention. To achieve these and other advantages and in accordance with the purpose of the invention, as embodied and broadly described herein, an ice system is provided for production, collection, storage and distribution of ice particles. Particularly, the present invention includes an ice collection bin to be incorporated in the ice system.

In the present invention, the ice collection bin includes an interior surface and exterior surface. The interior surface defines an interior chamber that is used to collect ice particles produced by an ice making machine. The ice collection bin includes a level control system that includes a level sensor assembly and that controls the level of ice particles in the ice collection bin. Sensor pockets protect the level sensor assembly from the contents of the interior chamber (e.g., ice particles), as well as from the tools used in the interior chamber of the ice collection bin, such as ice paddles, and ice scoops.

In the preferred embodiment, the ice collection bin is rectangular, and includes a body and a cover. The body includes an interior surface, preferably constructed of polyethylene, and an exterior surface, preferably constructed of stainless steel. The cover includes an interior surface and exterior surface having a space defined therebetween; the space is preferably filled with sheet Styrofoam. The cover preferably is reinforced with tubular stainless steel or otherwise provided with sufficient structural strength so that an ice making machine may be mounted thereon. Ice particles produced by the ice making machine fall into the ice collection bin through a top access opening disposed in the cover of the ice collection bin. When the ice collection bin becomes full, the level sensor assembly signals a controller unit, such as a control panel, which deactivates the ice making machine. This prevents the ice collection bin, and consequently the ice making machine, from overflowing with ice particles. In this manner the level sensor assembly protects the components of the ice making machine. The ice collection bin includes a front access opening and associated access door through which ice particles may be removed with an ice scoop, or stirred or broken apart with an ice paddle. Additionally, the ice collection bin includes a discharge chute through which ice particles exit the ice collection bin.

In the preferred embodiment, the level sensor assembly includes two photo eye sensors, including a transmitter and receiver. A corresponding sensor pocket is mounted to the cover of the ice collection bin for each photo eye sensor such that the sensor pockets extend interiorly therefrom into the interior chamber of the bin. Each sensor pocket is configured to house and substantially enclose a level sensor assembly, but includes a prealigned aperture to facilitate photo-electric signal communication between the transmitter and receiver. Each sensor pocket is constructed of sufficiently durable material, such as stainless steel, and includes an upper through port through which the corresponding wires of the level sensor assembly can be extended. In this manner, the sensor pockets protect the level sensor assembly from ice particles, ice paddles, ice scoops and other tools during operation of the ice system. The photo eye sensors are in electrical communication with the controller unit and when the ice collection bin is full, the signal from the transmitter to the receiver is blocked and the level sensor assembly signals the controller unit to deactivate the ice making machine. When a sufficient amount of ice is removed from the bin so that the signal from the transmitter to the receiver is no longer blocked, the level sensor assembly signals the controller unit to activate the ice making machine so as to continue ice making operation.

The ice collection bin of the preferred embodiment includes a discharge chute in the bottom of the bin through which ice may be discharged to a cart. The discharge chute is manually opened and closed using a gate assembly or similar gate device. The ice collection bin is supported by an elevated frame that is configured so that a cart may be positioned underneath the discharge chute between the legs of the elevated frame, and so that ice particles may fall freely from the discharge chute to the cart below. The cart is used to collect and transport ice to other locations. The cart preferably is constructed of lightweight polyethylene, and is supported by four wheels. The cart includes a top having two doors, each of which is connected to the cart by recessed hinges located along an opposite side of the cart. The doors and hinges are configured so that when opened, the doors swing outwardly from the longitudinal center line of the cart, and fold back against the sides of the cart. The doors and hinges are also configured so that the doors may be easily removed for cleaning and sanitizing.

It is to be understood that both the foregoing general description and the following detailed description are exemplary and are provided for purposes of explanation only, and are not restrictive of the invention as may be claimed in a future related, non-provisional application.

BRIEF DESCRIPTION OF DRAWINGS

The accompanying drawings, which are incorporated in and constitute a part of this specification, illustrate the preferred embodiment of the invention, and together with the description, serve to explain the principles of the invention.

DETAILED DESCRIPTION OF THE PREFERRED EMBODIMENT

Reference will now be made in detail to the present preferred embodiment of the ice collection bin, as well as to the carts and ice system of the present invention. Examples are illustrated in the accompanying drawings. Wherever possible, the same reference characters will be used throughout the drawings to refer to the same or like parts. The operation of the present invention will be described in conjunction with the detailed description of the ice collection bin and ice system for clarity.

In accordance with the present invention, an ice system is provided for producing ice particles using a freezable liquid from a liquid source, and for collecting the ice particles for subsequent transport or use. The ice system of the present invention may be used for producing and storing ice particles of a variety of shapes and sizes, including cubes, flakes and similar forms. As such, the ice system of the present invention includes any of a number of known ice making machines to produce the ice particles. For example, and as embodied herein, a conventional ice flaking machine may be provided in accordance with the present invention. It is understood that alternative ice making machines may be used if desired.

Figure 1:
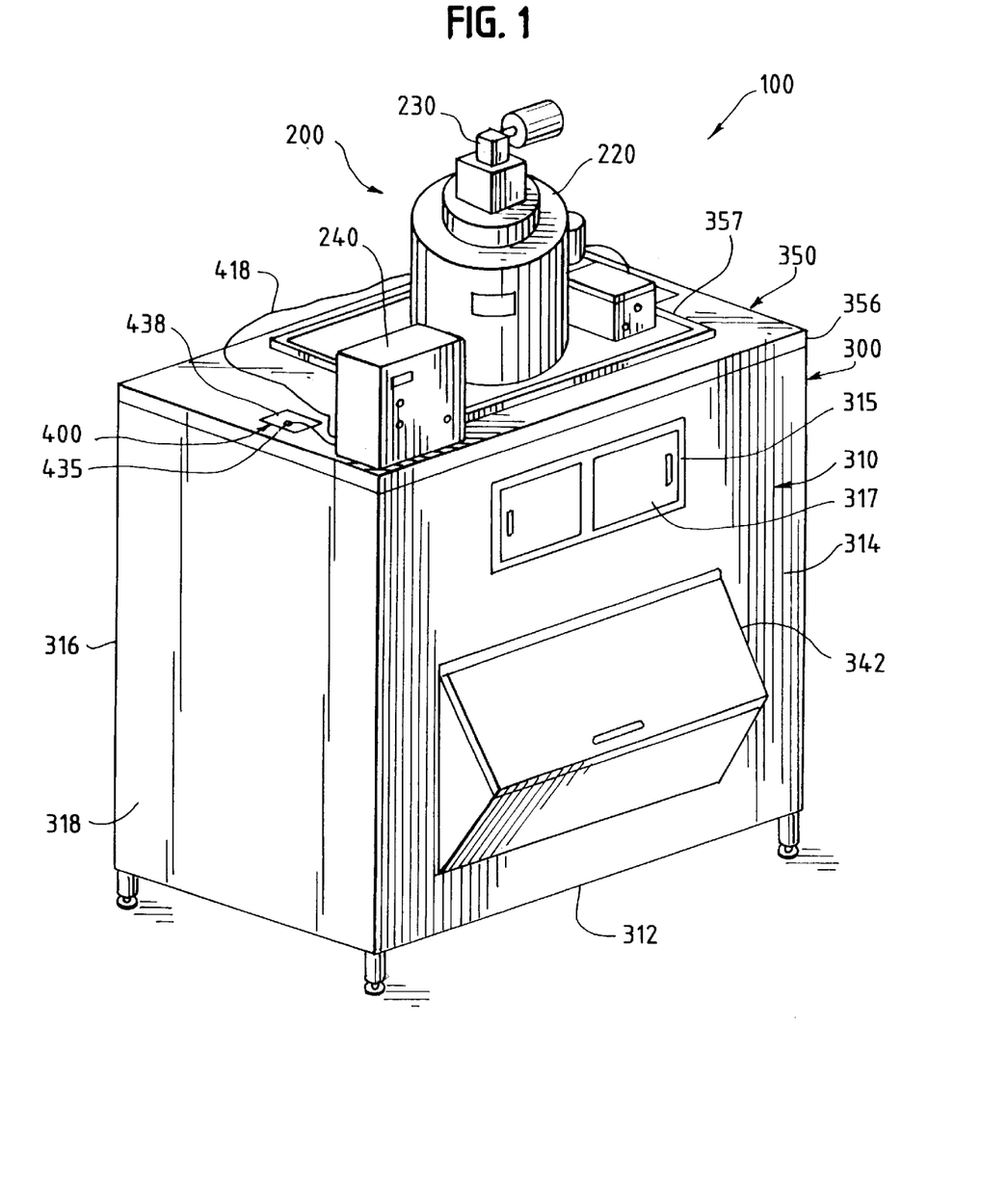
FIG. 1 is a front perspective view of a representative embodiment of the ice system of the present invention.
Figure 2:
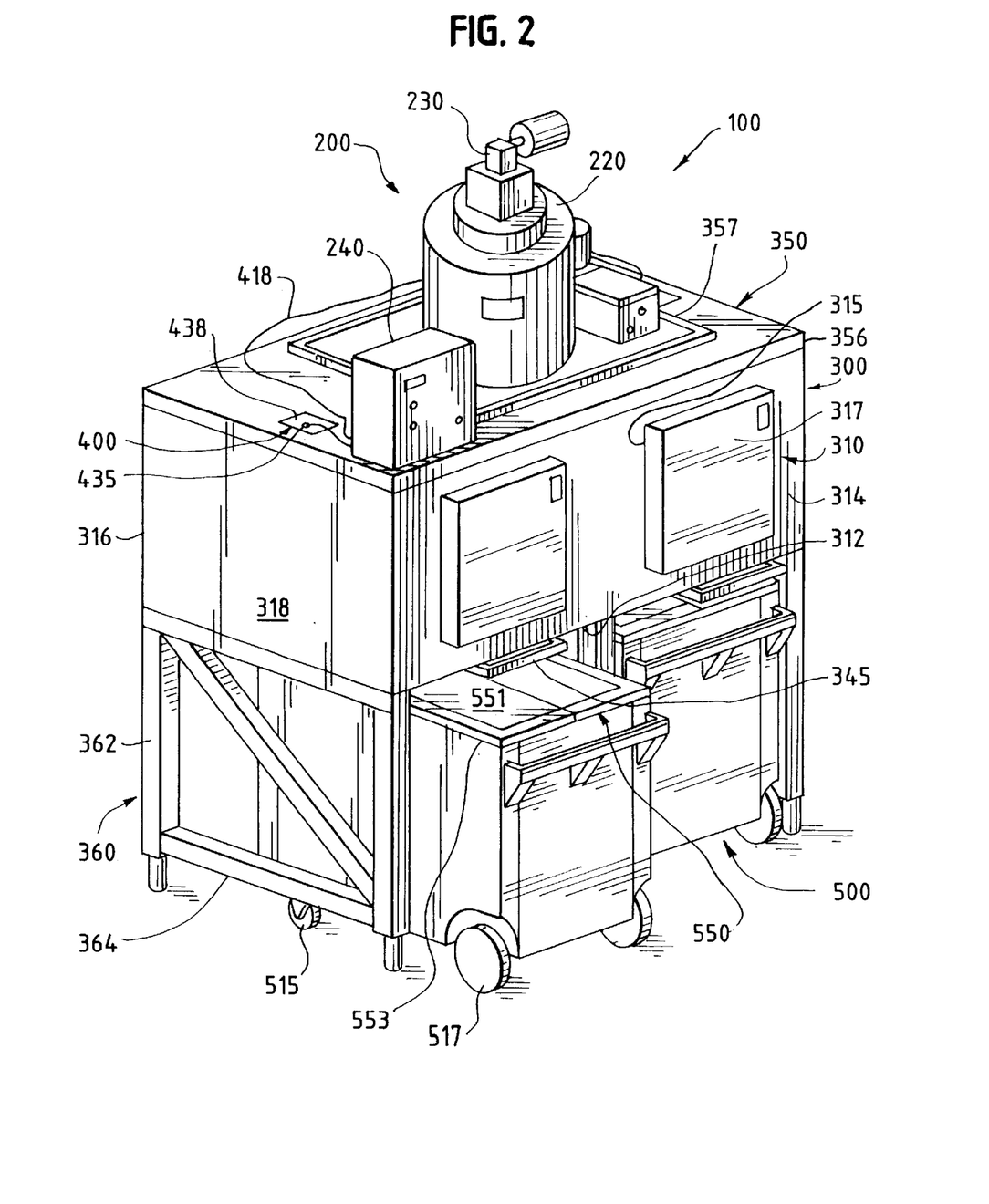
FIG. 2 is a front perspective view of another representative embodiment of the ice system of the present invention.
Figure 3:
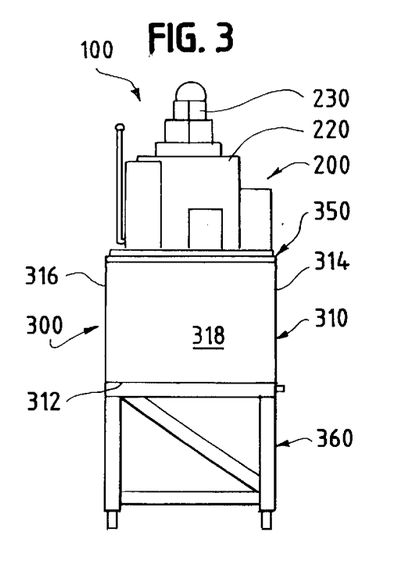
FIG. 3 is a side elevation view of the ice system shown in FIG. 2.
Figure 4:
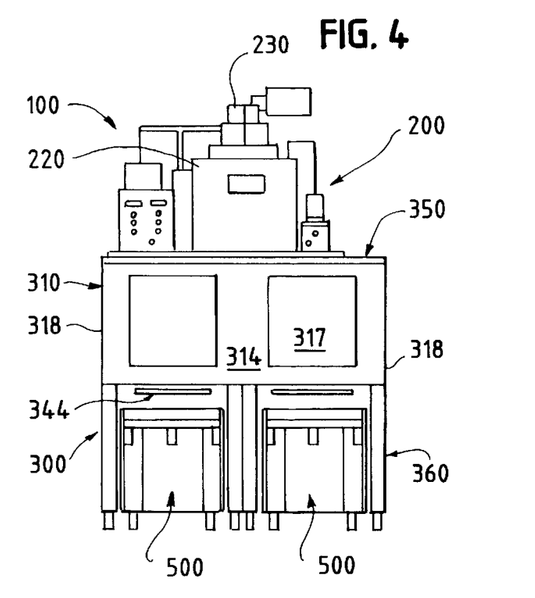
FIG. 4 is a front elevation view of the ice system shown in FIG. 2.

For purpose of illustration, and not limitation, FIGS. 1 and 2 each shows a representative embodiment of the ice system 100 having an ice making machine 200. The conventional flake freezing machine generally includes a cylindrical-shaped inner surface, a cylindrical-shaped exterior surface, and an annular chamber defined therebetween. Freezable liquid is distributed along the inner surface of an evaporator 220 using a nozzle provided on a rotatable shaft. The rotatable shaft is driven by a drive mechanism 230 which is controlled by a controller unit, such as a control panel 240 as embodied herein. The flake freezing machine also includes a sump pump which collects and recirculates freezable liquid that does not freeze on the inner surface of the evaporator 220. A refrigerant flows through the annular chamber of the evaporator 220. The refrigerant is circulated through the annular chamber as part of a conventional refrigeration cycle, including an accumulator, compressor, condenser, receiver, and heat exchanger. In this manner, refrigerant cools the inner surface of the evaporator 220 and causes the freezable liquid to freeze in a sheet of ice on the inner surface. A blade provided on the rotatable shaft removes the sheet of ice in the form of flakes. The flakes drop from the blade through a discharge opening provided in the bottom of the ice flaking machine. Such ice flaking machines are conventional and commercially available from Howe Corporation of Chicago, Ill., ranging in daily capacity from 1,000 to 20,000 pounds.

In accordance with the present invention, and in addition to the ice making machine, the ice system includes an ice collection bin having a level control system to measure the level of the of ice particles in the ice collection bin. FIGS. 1 and 2 show two different embodiments of the ice collection bin, although both are constructed in a similar manner. As described further below, the level control system includes at least one level sensor assembly housed in a sensor pocket that is configured so that ice particles, ice paddles, ice scoops or other items used in the operation of the ice system neither misalign nor damage the level sensor assembly.

As shown in the alternate embodiments of FIGS. 1 and 2, the ice collection bin 300 is generally rectangular in shape, but may be square, cylindrical, or of any other shape capable of collecting and storing ice particles. The ice collection bin 300 has thermal insulating capabilities and consists of a body 310 and a cover 350. The body 310 of either embodiment is a rectangular box with an open top. The rectangular-shaped body of the preferred embodiment includes a bottom wall 312, front wall 314, back wall 316 and two side walls 318.

Figure 5:
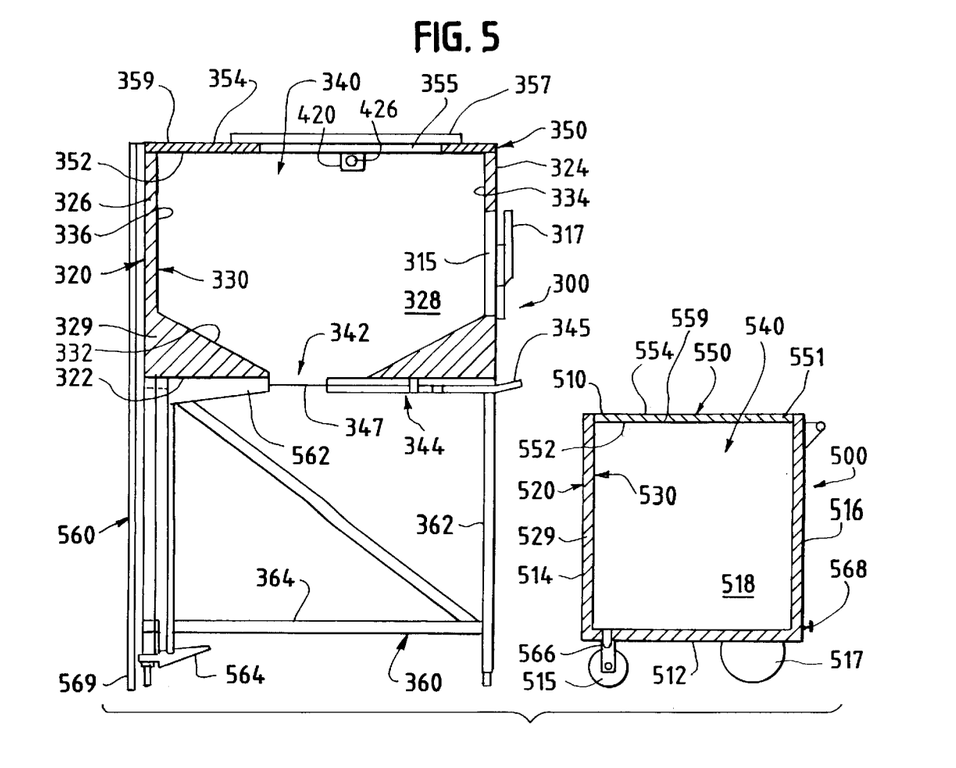
FIG. 5 is an exploded cross-sectional side view of the ice collection bin and cart of the ice system shown in FIG. 2.

To facilitate the thermal capability, the ice collection bin 300 is preferably provided with a dual wall construction, so as to include an exterior surface and an interior surface. For purpose of illustration, FIG. 5 shows that exterior surface 320 generally includes a bottom surface 322, front surface 324, back surface 326 and opposing side surfaces 328; similarly, the interior surface 330 includes corresponding bottom surface 332, front surface 334, back surface 336 and opposing side surfaces 338. The exterior surface 320 of the body 310 preferably is constructed of stainless steel and the interior surface 330 of the body 310 is constructed of an insulating material, preferably polyethylene or interpon, although other materials of construction may be used if desired. Defined between the corresponding exterior and interior surfaces of the ice collection bin 300 is a space or gap 329, as shown in FIG. 5. The space 329 may remain vacant to serve as an insulating dead air space or may be filled with a thermal insulating material, such as polyurethane or the like.

Figure 6:
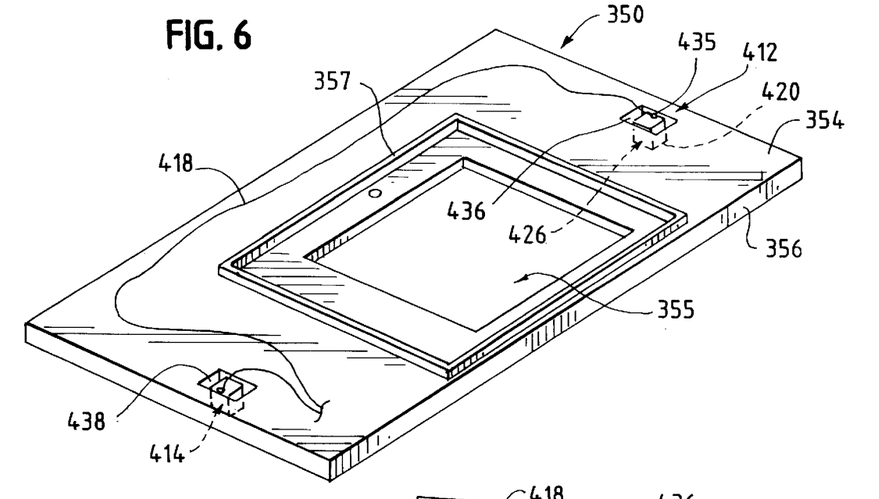
FIG. 6 is a top perspective view of the cover for the ice collection bin of the ice system of the present invention.

Similar to the body 310 of the ice collection bin, the cover 350 also is preferably of a dual wall construction. The cover 350 therefore incudes an interior surface 352 and an exterior surface 354 which, as best shown in FIG. 6, are joined at their edges by four side flanges 356. The interior surface 352 and exterior surface 354 and side flanges 356 of cover 350 preferably are constructed of stainless steel and define a gap or space 359 therebetween. The space 359 may be filled with an insulating material, preferably sheet styrofoam, or may remain vacant to define an insulating dead air space. Additionally, it is desirable to strengthen the cover 350 using reinforcing steel tubes or the like, which are embedded between the exterior and interior surfaces.

The interior surface 330 of the body 310 of the ice collection bin 300 defines an interior chamber 340 used to collect or store ice particles. The cover 350 of the ice collection bin 300 therefore is used to close the open top of the body 310. Furthermore, the ice collection bin 300 is configured so that the conventional ice making machine 200 and its associated controller unit 240 can be mounted on the cover 350 as shown in FIGS. 1 and 2. The cover 350 of the ice collection bin 300 therefore includes an access opening 355 through which ice particles can be discharged from the ice making machine 200 into the interior chamber 340 of the ice collection bin 300. As further described herein, a drip pan 357 having upright walls integrally disposed on the cover 350, surrounds the top access opening 355 to collect condensate from the ice making machine 200. Additionally, certain refrigeration cycle components also may be mounted on the cover 350 of the ice collection bin if desired or necessary. Furthermore, the ice collection bin cover 350 is preferably configured to support ice making machines with different size base profiles. In the preferred embodiment, the access opening 355 is a fifteen inch square opening, and the outer periphery of the drip pan is a rectangle and measures 30 inches by 32 inches.

The body 310 of the ice collection bin 300 also includes at least one front access opening 315 in front wall 314 through which ice particles may be removed from, stirred in, or broken apart in, the interior chamber 340. Generally, such operations are performed using a paddle or scoop inserted through the front access opening 315. The front access opening 315 includes a conventional gasketed, insulated access door 317 to maintain the thermal capabilities of the ice collection bin 300. In the representative embodiment of FIG. 1, the ice collection bin 300 is a free-standing, upright unit. A second access opening, or discharge chute 342, is provided in the front wall 314 for greater access to the ice particles stored in the ice collection bin 300. Hence, the front access opening 315 may be used to access the ice particles for stirring using a paddle, where the discharge chute 342 is used for removing ice particles using a scoop or similar tool. Although generally larger in capacity, this upright unit is constructed in a manner similar to that of the ice collection bin 300 shown in FIGS. 2–5.

FIGS. 2–5 show an alternative embodiment of the present invention, and particularly of the ice collection bin 300. Although similar in overall construction to that of FIG. 1, the ice collection bin 300 of FIGS. 2–5 includes a discharge chute 342 in the bottom wall 312 through which ice particles discharge from the ice collection bin 300 into a mobile cart 500 or other transporter. The discharge chute 342 preferably is opened and closed using a gate assembly 344 including an operating handle 345 connected to a gate member 347. In the closed position, the operating handle 345 for the gate assembly 344 extends slightly laterally outward of the bottom of exterior front surface 324 as shown in FIG. 5, and the gate member 347 extends transversely across the discharge chute 342. As further evident from FIG. 2, the discharge chute 342 is opened by pulling the gate assembly 344 laterally outward such that the discharge chute 342 is exposed. Preferably, the gate assembly 344 is constructed of stainless steel with the operating handle 345 having Delron sides.

In the preferred embodiment, ice collection bin 300, either individually as shown in FIG. 1 or in combination with mobile carts 500 as shown in FIGS. 2–5, should have maximum capacity that is between 30% and 60% of the estimated daily ice production of the ice making machine used in the ice system, with a preferred capacity of about 50%. In this manner the ice collection bin 300 generally does not collect and store ice particles for an extended period of time.

The ice system of the present invention also includes a level sensor assembly to monitor and, ultimately, control the level of ice particles within the ice collection bin. A variety of ice level assemblies are known and may be used in the present invention. The preferred embodiment, however, uses a level sensor assembly 400 including two photoelectric or photo eye sensors 410 operating as a transmitter 412 and a receiver 414, respectively to determine the level of ice particles in the ice collection bin 300. In combination with the controller unit 240, the level sensor assembly 400 therefore forms part of a level control system. When ice particles in the ice collection bin 300 reach a predetermined level, the level sensor assembly 400 transmits a signal to the ice making machine controller unit 240 to deactivate the ice making machine 200 and, thus, stop the production of ice particles. In this manner, the level control system prevents an overflow of ice particles in the ice collection bin 300 so that the ice particles may properly discharge from the ice making machine 200. Further, the level control system prevents a build up of ice particles in the ice making machine 200 which could result in damage to the drive mechanism 230 or other components of the ice making machine 200.

In the preferred embodiment, the level control system deactivates and activates the ice making machine 200 depending on the level of ice particles in the interior chamber 340. If the ice particles block the signal from the transmitter 412 for more than fifteen seconds, the controller unit 240 shuts down the ice making machine 200. Once deactivated, if the signal from the transmitter 412 is received by the receiver 414 for at least fifteen seconds, the controller unit 240 reactivates the ice making machine 200.

In accordance with the present invention, the level sensor assembly is housed in sensor pockets that protect and maintain alignment of the level sensor assembly. Particularly, and as preferably embodied herein, each sensor pocket 420 is configured to house either the transmitter 412 or the receiver 414, and is pre-aligned at the desired location so that the level sensor assembly 400 can send or receive signals as needed to sense the level of ice particles in the ice collection bin 300. In this manner, the level sensor assembly 400 has minimal damaging exposure to ice particles, ice paddles, or ice removal tools in the interior chamber 340 during operation of the ice system 100 and remains properly aligned.

Figure 7:
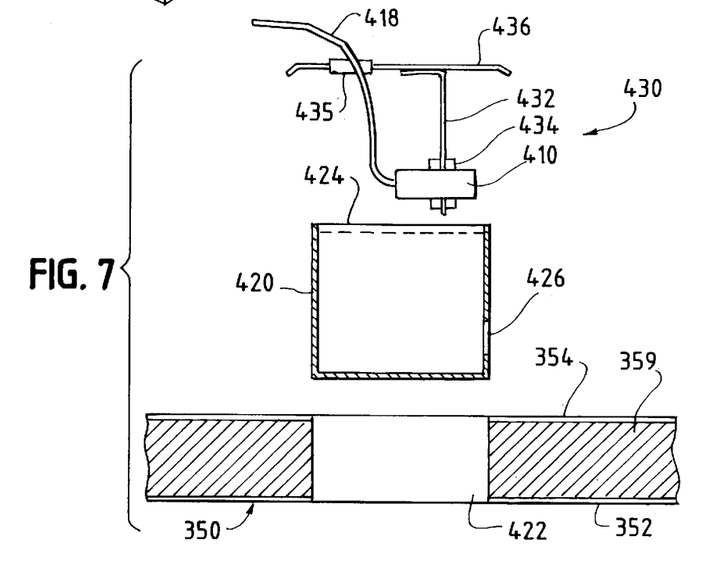
FIG. 7 is an exploded cross-sectional side view of the level sensor assembly for the ice system of the present invention.
Figure 8:
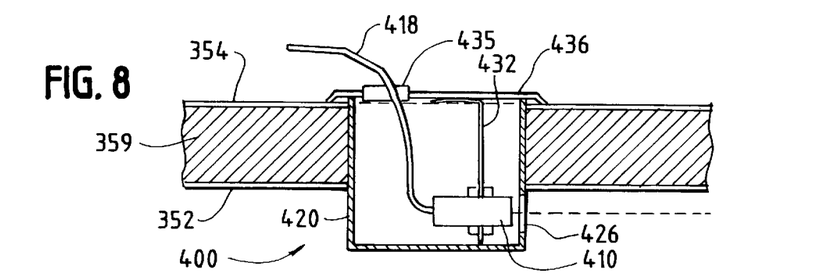
FIG. 8 is a cross-sectional side view of the level sensor assembly, as assembled, for the ice system of the present invention.

In the preferred embodiment, and as best shown in FIGS. 6–8, the level sensor assembly 400 includes two photo eye sensors 410, including a transmitter 412 and receiver 414 that are in electrical communication with the controller unit 240. Two rectangular-shaped sensor pocket openings 422 are disposed in the cover 350 of the ice collection bin 300 on opposite sides of the access opening 355 and drip pan 357. A sensor pocket 420 is supported in each sensor pocket opening 422, such as by flange 424. Each sensor pocket 420 extends downwardly into the interior chamber 340 and includes a signal opening 426 that is positioned to extend interiorly of the interior surface 352 of cover 350 in a direction toward the access opening 355. The sensor pocket 420 then is welded or otherwise secured into place within the sensor pocket opening 422. The sensor pocket 420 preferably is formed from a single generally cross-shaped piece of stainless steel by folding and seam welding the four legs of the cross-shaped piece so that a topless rectangular box is formed for stability.

Each photo eye sensor 410 is suspended within a corresponding sensor pocket 420 using a mounting assembly 430. The mounting assembly 430 includes a cover plate 436 having a downwardly depending mounting bracket 432. A corresponding photo eye sensor 410 is attached to the mounting bracket 432 using bolts 434 or the like. With the photo eye sensor 410 properly mounted, the cover plate 436 is then positioned over the sensor pocket opening 422 such that the photo eye sensor 410 is directed toward and in alignment with the signal opening 426 and, thus, the photo eye sensor 410 in the opposite sensor pocket 420. The cover plate 436 is then secured to the cover 350 using screws 438 located in prelocated holes to cover the sensor pocket opening 422. Each cover plate 436 includes a wire opening 435 through which wire 418 from the corresponding photo eye sensor 410 may be extended to the controller unit 240 without requiring the wire 418 to be located within the ice collection bin 300 itself.

In this manner, there is external access to the photo eye sensors 410 and associated wiring for purposes such as maintenance, repair and removal. The sensor pocket 420, sensor pocket opening 422, and mounting assembly 430 are configured so that when each photo eye sensor 410 is mounted using the mounting assembly 430 to a sensor pocket 420 that is secured to a sensor pocket opening 422 in the cover 350, then the photo eye sensors 410 are suspended in a pre-aligned configuration just below the plane of the interior surface 352 of the cover 350 and, when unobstructed by ice particles, the signal from the transmitter 412 is received at the receiver 414.

Although the preferred embodiment positions the sensor pockets 420, and thus the photo eye sensors 410, proximate the access opening 355 in the cover 350, it is understood that the sensors may be located in additional or alternative locations. For example, it is possible to locate the sensor pockets and sensors in the bottom wall 312 of the ice collection bin 300 that is shown in FIGS. 2–5 proximate the discharge chute 342. In this manner, the ice making machine 200 can be operated with the gate assembly 344 opened to first fill a mobile cart 500. Once the mobile cart 500 is filled, the sensors will deactivate the ice making machine 200 to prevent over filling, and the gate assembly 344 can then be closed. Furthermore, the lower sensors can be connected such that the lower sensors are only controlling when the gate assembly 344 is opened. When closed, the upper sensors located proximate the access opening 355 in cover 350 will be controlling. As such, when the gate assembly 344 is closed the ice making machine 200 will operate until the sensors located proximate the access opening 355 in the cover 350 indicate that the ice collection bin 300 is full.

In the preferred embodiment of FIGS. 2–5, and as noted above, at least one cart 500 is provided to collect ice particles that discharge from the interior chamber 340. Although FIGS. 2–5 show a preferred embodiment using two such carts 500, one for each discharge chute 342 provided in the ice collection bin 300, reference hereinafter will be made to one cart for simplicity. FIGS. 2–5 show a representative embodiment of the cart 500, which is positioned below the ice collection bin discharge chute 342. The ice collection bin 300 of FIGS. 2–5 therefore is supported by an elevated frame 360. The elevated frame 360 preferably is constructed of steel and includes four legs 362, each located a corner of the ice collection bin 300. The elevated frame 360 also includes cross support members 364, as may be required to sufficiently strengthen the elevated frame 360 to support the associated weight of the ice making machine 200, ice collection bin 300 and related components. The elevated frame 360 is appropriately configured, however, so that no support member obstructs the front plane of the elevated frame. In this manner, the cart 500 easily may be positioned beneath the discharge chute 342 and easily may be removed therefrom to transport ice particles.

As best shown in FIG. 5, the cart 500 is preferably made of a dual wall construction so as to include an interior surface 530 and an exterior surface 520. Preferably, the cart 500 is constructed of polyethylene by conventional roto-molding techniques to form the dual wall construction with a space 529 defined therebetween. The space 529 may remain vacant to form an insulating dead air space or be filled with an insulation material such as polyurethane. The interior surface 530 of the cart defines an inner well 540, preferably of about 200 pound capacity, which is used to collect or transport ice particles. As such, and as shown in FIGS. 2–5, the cart 500 includes a front wall 514, rear wall 516, bottom wall 512 and two side walls 518. The top edge of the front wall 514, rear wall 516, and two side walls 518 define a top opening 510. The cart 500 also includes a cover 550 which includes two doors 551, each pivotally mounted to the cart 500 by recessed hinges 553 and attached proximate the top opening 510 along the opposite side walls 518. Each door 551 includes an interior surface 552 and an exterior surface 554 which together define a space 559 that is preferably, although not necessarily, filled with an insulating material such as polyurethane. The hinges 553 are recessed such that when opened, either door 551 is folded down to rest flush along the corresponding side wall 518 to which the opened door 551 is attached. Additionally, the hinges 553 are designed to allow for easy removal of the doors 551 for cleaning and sanitizing. The cart 500 of the preferred embodiment is supported by four wheels. Preferably, two wheels 517 of larger diameter, such as ten inches, are provided at one end of the cart 500 and are fixed with respect to the vertical axis, and two wheels 515 of smaller diameter, such as five inches, are provided at the opposite end of the cart 500 and swivel about a respective vertical axis. Additionally, it is preferable to provide at least one locking mechanism (not shown) of conventional construction to secure the position of the cart 500 when desired or necessary.

Rather than the cart 500 of the preferred embodiment, other suitable means may be used to collect and transport ice particles that are discharged from the ice collection bin 300. For example, a conventional self-dumping hopper may be used as modified to include the aspects of the invention.

The ice collection bin 300 of the preferred embodiment also may be configured for simultaneous collection of ice particles by more than one cart 500. In such case, the ice collection bin 300 preferably has two or more front access openings 315 disposed in front wall 314, and two or more discharge chutes 342 disposed in bottom wall 312. The discharge chutes 342 are arranged so that each cart 500 may be positioned underneath a discharge chute 342, between the vertical support members 362 of elevated frame 360 for simultaneous collection of ice particles.

As embodied herein, the ice system 100 includes a condensate drainage system 560. As shown in FIG. 6, the ice collection bin cover 350 includes a drip pan 357 to collect condensate from the ice making machine 200. With regard to the upright embodiment of FIG. 1, a separate drain line is provided in fluid communication with the drip pan 357 of the cover 350. Additionally, a lower drain bin and associated drain line is positioned underneath and is in fluid communication with the bottom surface 332 of the interior chamber 340 of the ice collection bin 300.

With regard to the embodiment of FIGS. 2–5 for purpose of example, the ice collection bin 300 also includes at least one upper drain pan 562 mounted directly rearward of the discharge chute 342, underneath and substantially adjacent to the bottom exterior surface 322. When the gate assembly 344 is in its closed position, condensate flows from the interior chamber 340 to the upper drain pan 562 through a slot disposed in the bottom wall 312 at the rear of the discharge chute 342. The ice system 100 of the preferred embodiment also includes a lower drain pan 564 for condensate from the cart 500. The lower drain pan 564 is mounted directly below the upper drain pan 562, on the elevated frame 360 just above floor level. The cart 500 is configured so that fluid connection may be made between the inner well 540 and the lower drain pan 564. Preferably, the cart 500 includes piping 566 with an inlet disposed in inner well 540 at bottom wall 512 and an outlet that both extends proximate front wall 514 and is capable of a screw fit with a nipple (not shown) that is in fluid connection with the lower drain pan 564. Preferably, condensate flow from the cart 500 to the lower drain pan 564 is controlled by a manually operated valve 568 located at the rear of cart 500 as shown in FIG. 5. In the preferred embodiment, the drip pan 357, the upper drain pan 562, and lower drain pan 564 each include an outlet that is in fluid connection with one another. In this manner, a single drain 569 is used in the condensate drainage assembly 560. In a multiple cart ice system, there is an upper drain pan 562 and slot for each discharge chute 342, and a lower drain pan 564 for each cart 500.

Other embodiments of the invention will be apparent to those skilled in the art from consideration of the specification and practice of the invention disclosed herein. It is intended that the specification and examples be considered as exemplary.

We claim:

1. A collection bin for collecting frozen particles, the collection bin comprising:
   an interior surface defining an interior chamber;
   an exterior surface spaced a distance from the interior surface;
   an inlet to the interior chamber for receiving particles;
   a level control system for controlling the level of particles in the interior chamber, the level control system including,
      a level sensor assembly having at least one level sensor positioned to sense a level of particles within the interior chamber, wherein the level sensor includes a photo eye transmitter and a photo eye receiver and
      a control panel in electrical communication with the level sensor assembly; and
   a sensor pocket that substantially encloses a portion of the level sensor without inhibiting operation of the level sensor assembly, wherein the level sensor assembly is connected with the sensor pocket using a mounting assembly, the mounting assembly including a cover plate and mounting bracket.

2. The collection bin of claim 1, wherein the cover plate includes an aperture through which the electrical communication between the level sensor assembly and the control panel occurs.

3. A collection bin for collecting frozen particles, the collection bin comprising:
   a cover having an interior surface and an exterior surface;
   a body having an exterior surface and an interior surface defining an interior chamber;
   an inlet to the interior chamber for receiving particles;
   a level control system for controlling the level of particles in the interior chamber, the level control system including a level sensor assembly having at least one level sensor positioned to sense the level of particles within the interior chamber; and
   a sensor pocket which includes apertures positioned to align with at least one sensor of the level sensor assembly when the level sensor assembly is connected with the sensor packet, wherein the sensor pocket substantially encloses a portion of the level sensor without inhibiting operation of the level sensor assembly, and wherein the level sensor assembly is connected with the sensor pocket using a mounting assembly, the mounting assembly including a cover plate and mounting bracket.

4. The collection bin of claim 3, wherein the level control system further includes a control panel in electrical communication with the level sensor assembly.

5. The collection bin of claim 4, wherein the cover plate includes an aperture through which the electrical communication between the level sensor assembly and the controller unit occurs.

6. A system for collecting, storing, and transporting frozen particles, the system comprising:
   a frozen particle making machine;
   a collection bin including,
      (1) a cover having an interior surface and exterior surface;
      (2) a body having an exterior surface and an interior surface defining an interior chamber;
      (3) an inlet to the interior chamber for receiving particles from the frozen particle making machine wherein the inlet is disposed in the cover;
      (4) a level control system for controlling the level of particles in the interior chamber, the level control system including a level sensor assembly having at least one level sensor positioned to sense the level of particles within the interior chamber; and
      (5) a sensor pocket that substantially encloses a portion of the level sensor without inhibiting operation of the level sensor assembly;
   an elevated frame for elevating the collection bin; and
   a cart for storing or transporting frozen particles wherein the cart includes an inner well;
   a drainage system for draining condensate from the system wherein the drainage system is communicatively connected to the inner wall of the cart and includes:
      (1) a drip pan disposed around the inlet of the cover for collecting condensate from the frozen particle making machine; and
      (2) a drain line communicatively connected to the drip pan, the drain line also communicatively connected to each of an upper drip pan located near the discharge chute for collecting condensate from the frozen particle collection bin and a lower drain pan located at a lower end of the elevated frame for collecting condensate from the cart.

* * * * *